United States Patent

Miyauchi et al.

[15] 3,701,847

[45] Oct. 31, 1972

[54] ELECTRON BEAM RECORDER

[72] Inventors: Sakae Miyauchi, 4-13, 3-chome, Yato-machi, Tanashi-shi, Tokyo; Kazumitsu Tanaka, 458 Gochi-cho; Nobuo Goto, 2246-5, Kurinoshawa, Haijima-cho, both of Akishima-shi, Tokyo, all of Japan

[22] Filed: Aug. 17, 1971

[21] Appl. No.: 172,523

[30] Foreign Application Priority Data

Aug. 20, 1970 Japan ......................45/72944

[52] U.S. Cl. ......178/6.7 A, 178/5.4 CD, 346/74 CR, 346/110

[51] Int. Cl. ............................H04n 5/86, H04n 9/16

[58] Field of Search..............346/110, 74 CR, 74 EB; 178/5.4 CD, 6.7 A, 6.7 R; 219/121 EB; 313/69; 250/49.5 E

[56] References Cited

UNITED STATES PATENTS

| | | | |
|---|---|---|---|
| 3,409,906 | 11/1968 | Jones | 178/6.7 A |
| 3,614,302 | 10/1971 | Goldberg | 178/6.7 A |

*Primary Examiner*—James W. Moffitt
*Assistant Examiner*—Steven B. Pokotilow
*Attorney*—John M. Webb

[57] ABSTRACT

An electron beam recorder comprises a plurality of electron guns, a condenser lens, a device for scanning the electron beams produced by the electron guns, a device for conveying a recording medium and a device for supporting said recording medium in a recording chamber forming part of the electron beam recorder. The electron beams are modulated by the information to be recorded. The beams intersect at the center of said condenser lens so as to impinge on different parts of said recording medium. The beams are made to scan the recording medium by the scanning device, each beam exposing different areas of said recording medium.

8 Claims, 4 Drawing Figures

ELECTRON BEAM RECORDER

This invention relates in general to an apparatus for recording television color pictures and/or other information by utilizing a plurality of electron beams. More particularly, it relates to an apparatus for recording a plurality of information groups on different parts of a radiant energy sensitive recording medium such as photographic film by utilizing a plurality of electron beams.

The recording of a television color picture information on an elongated radiant energy sensitive recording medium such as monochrome photographic film utilizing electron beams is a well known technique.

In accordance with this technique, the brightness signal of the television color picture information is recorded in one of the frames forming a first row of frames and the color signal produced by mixing two dissimilar signals, for example, the B–Y and R–Y signals, is recorded in the corresponding frame in a second row of frames arranged in parallel with the first row of frames.

A typical apparatus exemplifying the above technique was described in the Journal of the S.M.P.T.E., vol. 79, no. 8, Aug. 1970, pp. 677–86. The apparatus therein described includes two electron guns, the beam from one being modulated by the brightness signal and the beam from the other being modulated by the color signal. The two electron guns, as described, are disposed in such a way that the two beams emitted therefrom towards the recording medium are inclined at about 30° with respect to normal along the longitudinal axis of said medium. Individual condenser lenses are employed to converge the respective beams and individual deflection coils are used to scan said beams so as to expose different areas of said recording medium.

With such an apparatus, when the electron beam scans the recording medium longitudinally, the diameter of the electron beam spot gradually changes making accurate recording impossible. Moreover, raster scanning fails to produce an exposed area which is perfectly rectangular.

An object of this invention is to provide an electron beam recorder capable of eliminating the above imperfections.

Another object of this invention is to provide an electron beam recorder equipped with means for changing the direction of the electron beams orientated towards the recording medium.

Yet another object of this invention is to provide an electron beam recorder capable of maintaining the electron gun chamber at high vacuum, even when the recording chamber is exposed to the atmosphere, by providing a shielding diaphragm immediately below the condenser lens.

Still another object of this invention is to provide an electron beam recorder designed to shorten the time in which the recording medium is subjected to high vacuum.

Briefly according to this invention, the electron beam recorder incorporates at least two electron guns, one of which emits an electron beam modulated by information such as the brightness signal of a television color picture signal, the other emitting an electron beam modulated by other information such as the color signal produced by mixing two dissimilar signals.

In order to direct the two beams on different transversely spaced parts of the recording medium, the beams are made to intersect at the center of the common condenser lens. Also, in order to reduce the spot diameter and thereby increase the recording accuracy, the recording medium is positioned so that the distance between the medium and the center of the condenser lens is appreciably less than the distance between the center of the lens and the electron gun. Simultaneous beam scanning is effected by the provision of a scanning means located between the recording medium and the condenser lens, thereby exposing different transversely spaced areas on the recording medium.

Since the intersecting angle of the two beams can be made very small, the spot diameter on the recording medium only changes slightly and the exposed areas are perfectly rectangular in shape.

In addition to the foregoing, the present recorder is capable of converging or focusing a plurality of electron beams with high accuracy using only one condenser lens and scanning a plurality of electron beams with high accuracy using only one condenser lens and scanning a plurality of electron beams using only one scanning means.

Normally, when a magnetic condenser lens is used instead of an electrostatic lens, the inclined beams are rotated as well as focused so that any change in the magnetic field intensity causes the beam impinging positions to change proportionally. This problem has been solved in this invention by mounting the electron guns rotatably with respect to the plane of the recording medium. By so doing, the beam impinging positions can be corrected.

Furthermore, since the intersecting angle of the two beams is adjustable, the distance between the impinged positions on the recording medium can be increased or decreased without having to move the recording medium, etc.

Other objects and advantages of this invention will become apparent after reading of the following specification in conjunction with the accompanying drawings wherein.

Figure 1:
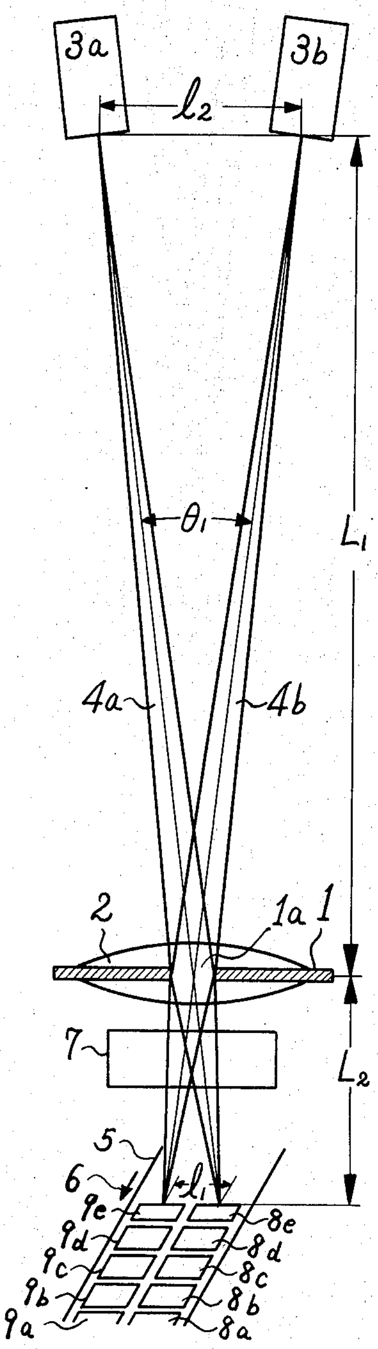
FIG. 1 is a schematic electron optics chart illustrating the operation of an electron beam recorder equipped with two electron guns.

Referring to FIG. 1, a diaphragm 1 is arranged in the condenser lens 2 to align the aperture 1*a* with the center of the lens. Moreover, the two electron guns 3*a* and 3*b* are orientated so that their respective emitted electron beams 4*a* and 4*b* intersect at the center of the condenser lens 2; in other words, the aperture 1*a* of the diaphragm 1. As a result, the two beams are converged or focused and impinged on transversely spaced portions on the recording medium 5. Arrow 6 indicates the direction in which the recording medium is moved or advanced.

A scanning device 7 is arranged between the condenser lens 2 and recording medium 5 in order to effect transverse line scanning or raster scanning and thereby expose different areas of the recording medium in transverse formation.

Further, to reduce the electron beam spot diameter to about 1 micron and thereby increase the recording accuracy, the apparatus has been designed so that the distance between guns 3*a* and 3*b* and the center of the condenser lens 2 designated $L_1$, is at least twice, preferably five times, the distance between the center of said lens and the recording medium 5, designated $L_2$.

In accordance with this arrangement, the electron beam 4*a* is modulated by the brightness signal (usually designated the "Y" signal) and the electron beam 4*b* is modulated by the color signal produced by mixing two dissimilar color signals, e.g., the R–Y and B–Y signals. As a result, the "Y" and color signals are simultaneously recorded in corresponding frames on the recording medium in transverse formation. To be more precise, the electron beam 4*a* successively forms the Y signal frames 8*a*, 8*b*, 8*c*, . . . etc. and the electron beam 4b successively forms the color signal frames 9*a*, 9*b*, 9*c*, . . . etc.

By means of this apparatus, with the distance $l_1$ between the impinging beams as little as several mm, an intersecting angle $\theta_1$ in the order of 1° to 5° with a comparatively large separation $l_2$ between the two guns is possible.

For example, if $l_1$ = 4mm, $L_1$ = 300mm and $L_2$ = 60mm, by calculation, $\theta_1$ will equal approximately 4° and $l_2$, 20mm.

Therefore, regardless of the direction of scanning or the amount of deflection, raster distortion will be minimal.

Figure 2:
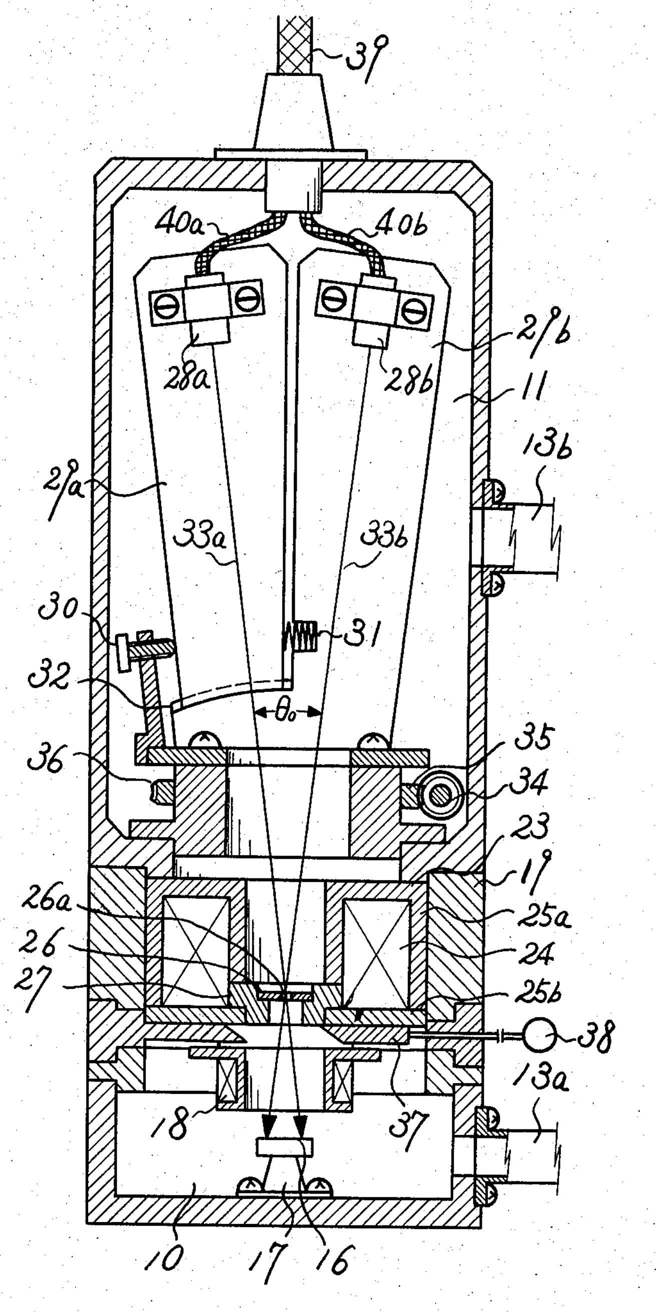
FIG. 2 is a cross sectional view of the recorder referred to in FIG. 1.
Figure 3:
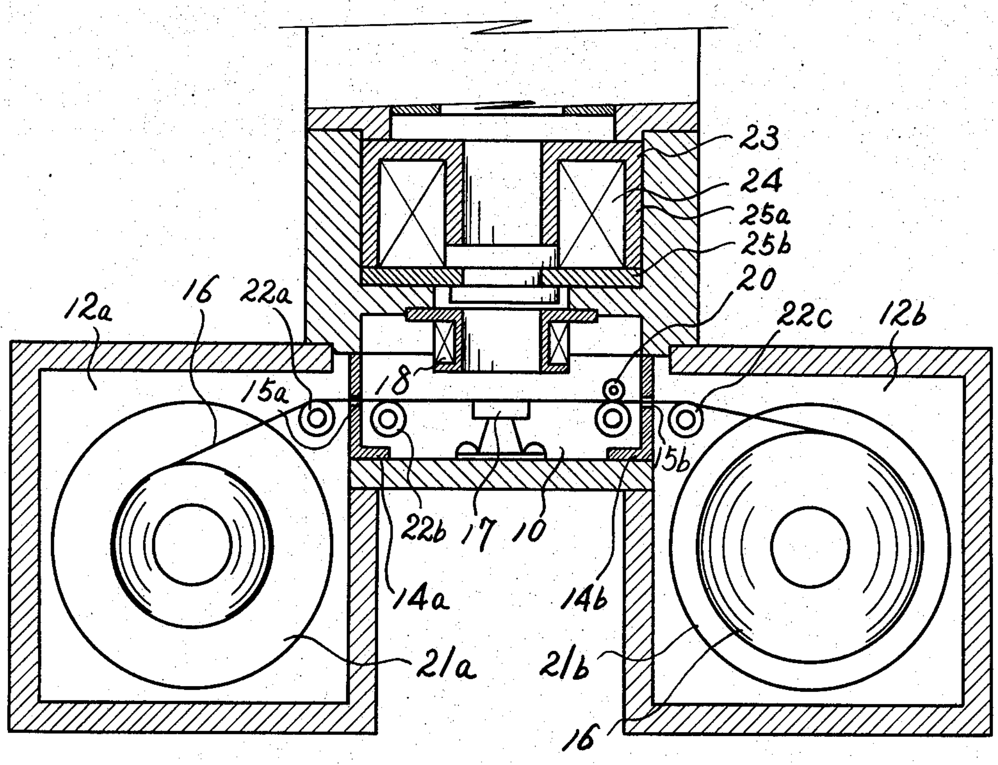
FIG. 3 is a cross sectional view of a recording chamber and film chamber.

Referring now to FIGS. 2 and 3, adjacent the recording chamber 10 are the electron gun chamber and the two film chambers 12*a* and 12*b*. The chambers 10 and 11 are maintained at a high vacuum of more than $10^{-4}$ Torr by connecting a vacuum pump (not shown) to the outlet pipes 13*a* and 13*b*. Chambers 12*a* and 12*b*, on the other hand, are maintained at about $10^{-1}$ Torr by means of a second vacuum pump (also not shown).

The recording chamber 10 is separated from the film chambers 12*a* and 12*b* by means of diaphragms 14*a* and 14*b* equipped with slits 15*a* and 15*b* through which the recording medium 16 passes.

A supporting means 17 for supporting the recording medium 16, a scanning means 18 secured to a wall 19 and a driving means 20 such as a capstan for advancing the recording medium 16 are housed in the recording chamber 10.

The recording medium 16, for example, photographic film, is wound on supply reel 21*a* in the film chamber 12*a* and fed into the recording chamber 10 via the slit 15*a*.

Inside the recording chamber 10 the recording medium 16 is passed over the supporting means 17 through the driving means 20, and then finally wound onto a take-up reel 21*b* in the film chamber 12*b* via the slit 15*b*.

Rollers 22*a*, 22*b* and 22*c* serve to guide the recording medium 16 through the slits 15*a* and 15*b*.

A magnetic condenser lens 23 comprising an exciting coil 24 and yokes 25*a* and 25*b* is secured to the wall 19 so as to locate between the recording chamber 10 and the electron gun chamber 11.

In this case, the beams are converged by the magnetic field produced in a small gap between the yokes 25*a* and 25*b*.

A diaphragm 26 is held in the lens 23 by a holder 27 so that the diaphragm aperture 26*a* aligns with the center of the lens.

Two electron guns 28*a* and 28*b* are respectively secured to base plates 29*a* and 29*b* at predetermined inclinations so that their emitted electron beams 33*a* and 33*b* intersect at the center of said lens 23 viz., the aperture 26*a* of diaphragm 26.

The electron guns are conventional three electrode type guns comprising a cathode, an anode and a control electrode.

Base plate 29*a* is disposed so as to slide on the face of base plate 29*b* by turning screw 30 in conjunction with spring 31.

The sliding face 32 forms part of a circle whose center lies at the center of condenser lens 23.

If base plate 29*a* is made to slide along face 32, the point of intersection remains the same but the intersecting angle $\theta_0$ formed by the electron beams 33*a* and 33*b* changes. As a result, the distance between the impinging beams ($l_1$ in FIG. 1) changes.

A worm gear 34 together with a worm wheel 35, which is secured to a rotating member 36, serves to rotate said rotating member 36. And, since base plate 29*b* is secured to the rotating member 36, if said rotating member is rotated by turning the worm gear 34, the base plates 29*a* and 29*b* will also rotate with respect to the recording medium 16 so that the beam impinging positions can be adjusted.

The advantage of this mechanical innovation is that the beams can be impinged on the recording medium in precise transverse formation.

A further advantage is that, when inclined beams pass through a magnetic condenser lens, the inevitable beam shift on the recording medium caused by the magnetic lens is corrected.

The inclusion of a diaphragm 37 between the condenser lens 23 and the scanning means 18 permits the lower part of the lens to be controllably opened and closed by means of knob 38, thereby joining and separating the recording chamber 10 and the electron gun chamber 11 optionally. By this means, either the recording chamber 10 or the electron gun chamber 11 can be exposed to the atmosphere without affecting the vacuum state of the other.

The two dissimilar signals to be recorded are fed to the control electrodes of the respective electron guns via cables 40*a* and 40*b* forming part of the main cable 39, so as to modulate the electron beams 33*a* and 33*b*.

The modulated beams intersect at the center of the condenser lens 23, and then simultaneously scan different areas of the recording medium 16 as it passes over the supporting means 17.

When recording a television color picture signal by means of the recorder, according to this invention, the Y signal and the color signal are respectively fed to the electron guns 28*a* and 28*b*. The electron beam 33*a* modulated by the Y signal and the electron beam 33*b* modulated by the color signal are then emitted from the respective electron guns so as to intersect at the center of the condenser lens 23. After passing through the lens, the two beams are simultaneously scanned over different areas of the recording medium in transverse order by the scanning means 18.

Figure 4:
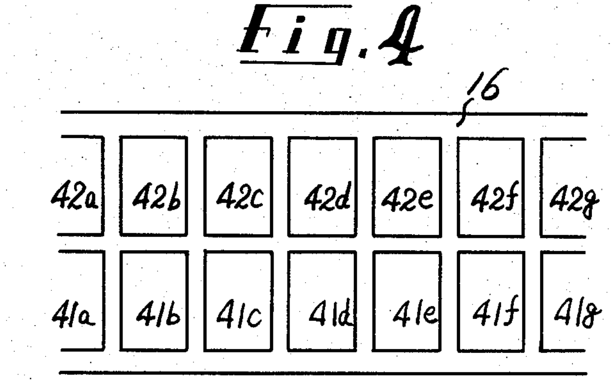
FIG. 4 is a plane view of an exposed recording medium, said exposures being recorded by the electron beam recorded shown in FIG. 2.

An exposed recording medium using the recorder being described is shown in FIG. 4. In the figure, frames were exposed by the electron beam 33*a*, in which the Y signal was recorded and frames 42*a*, 42*b*, 42*c* forming a second row of frames were exposed by the electron beam 33*b*, in which the color signal was recorded.

This invention is not limited to the aforedescribed embodiment; for example, beams bent so as to intersect each other at the lens center by means of a deflecting means arranged between the electron guns and the condenser lens can be used instead of the rectilinear beams emitted from the inclined electron guns.

Moreover, the number of recorded signals is not limited to two. By simply increasing the number of electron guns, the number of signals can be increased accordingly.

Having thus set forth the invention in sufficient detail and specifically to enable those skilled in the art to practice it, what is claimed is:

1. An electron beam recorder for recording a plurality of information groups at different transverse positions on an elongated radiant energy sensitive recording medium comprising:

A. a plurality of electron guns for producing a plurality of electron beams, each of which can be modulated with the information of one group;

B. a condenser lens for focusing said plurality of electron beams, said guns orientated such that the point of intersection of the beams is at the center of said condenser lens;

C. a means for supporting the recording medium in a recording chamber;

D. a means for simultaneously scanning said plurality of electron beams so as to expose different areas on said recording medium to different scanning beams; and E. a driving means for conveying said recording medium under the scanning beams.

2. An electron beam recorder as set forth in claim 1 in which the distance between the electron guns and the center of the condenser lens is greater than the distance between said center and said supporting means.

3. An electron beam recorder as set forth in claim 2 in which the electron guns are secured to a base plate at an adjustable inclination sufficient to cause the electron beams to intersect at the center of the condenser lens.

4. An electron beam recorder as set forth in claim 2 incorporating a diaphragm whose aperture aligns with the center of the condenser lens through which the electron beams pass.

5. An electron beam recorder as set forth in claim 2, incorporating a shielding diaphragm between the condenser lens and the scanning means to separate and join the electron gun chamber and the recording chamber.

6. An electron beam recorder as set forth in claim 2 having supply and take-up reels housed in respective film chambers maintained at a vacuum pressure different from that of the recording chamber.

7. An electron beam recorder as set forth in claim 2 in which said electron guns are secured to individual base plates, one of which can be adjusted with respect to the center of the lens so as to vary the angle of intersection.

8. An electron beam recorder as set forth in claim 7 in which said plates are designed to rotate with respect to said recording medium.

* * * * *

UNITED STATES PATENT OFFICE
CERTIFICATE OF CORRECTION

Patent No. 3,701,847 Dated October 31, 1972

Inventor(s) Sakae Miyauchi et al.

It is certified that error appears in the above-identified patent and that said Letters Patent are hereby corrected as shown below:

After the listing of the inventors insert
--Assignee: Nihon Denshi Kabushiki Kaisha --.

Signed and sealed this 1st day of May 1973.

(SEAL)
Attest:

EDWARD M. FLETCHER, JR.
Attesting Officer

ROBERT GOTTSCHALK
Commissioner of Patents